US008689142B2

(12) United States Patent
Pugsley et al.

(10) Patent No.: US 8,689,142 B2
(45) Date of Patent: Apr. 1, 2014

(54) METHOD AND APPARATUS FOR PROVIDING MEDIA CONTENT SEARCHING CAPABILITIES

(75) Inventors: Craig Pugsley, Paignton (GB); Jesmond Allen, Avon (GB); Jonathan Davies, Arnos Vale (GB)

(73) Assignee: Nokia Corporation, Espoo (FI)

( * ) Notice: Subject to any disclaimer, the term of this patent is extended or adjusted under 35 U.S.C. 154(b) by 217 days.

(21) Appl. No.: 12/631,569

(22) Filed: Dec. 4, 2009

(65) Prior Publication Data
US 2011/0138331 A1  Jun. 9, 2011

(51) Int. Cl.
G06F 3/048 (2013.01)

(52) U.S. Cl.
USPC ........... 715/835; 715/723; 715/727; 715/765; 715/810; 715/821

(58) Field of Classification Search
USPC .................. 715/835, 810, 821, 727, 723, 765
See application file for complete search history.

(56) References Cited

U.S. PATENT DOCUMENTS

| | | | |
|---|---|---|---|
| 5,616,876 A | 4/1997 | Cluts | |
| 6,920,445 B2 | 7/2005 | Bae | |
| 7,221,902 B2 | 5/2007 | Kopra et al. | |
| 7,236,652 B2 | 6/2007 | Kasutani | |
| 7,266,343 B1 | 9/2007 | Yli-juuti et al. | |
| 7,698,658 B2* | 4/2010 | Ohwa et al. | 715/835 |
| RE42,101 E * | 2/2011 | Chasen et al. | 707/805 |
| 8,321,042 B2* | 11/2012 | Nagayama | 700/94 |
| 2002/0082901 A1 | 6/2002 | Dunning et al. | |
| 2003/0177113 A1 | 9/2003 | Wakita | |
| 2003/0221541 A1 | 12/2003 | Platt | |
| 2004/0215657 A1 | 10/2004 | Drucker et al. | |
| 2005/0257169 A1* | 11/2005 | Tu | 715/810 |
| 2006/0195403 A1 | 8/2006 | New et al. | |
| 2006/0195789 A1* | 8/2006 | Rogers et al. | 715/727 |
| 2006/0230065 A1 | 10/2006 | Plastina et al. | |
| 2008/0168377 A1* | 7/2008 | Stallings et al. | 715/772 |
| 2008/0178120 A1 | 7/2008 | Yamamoto | |
| 2008/0196080 A1* | 8/2008 | Ozawa | 725/153 |
| 2008/0250312 A1 | 10/2008 | Curtis | |
| 2009/0006397 A1 | 1/2009 | Lehtiniemi et al. | |
| 2009/0144642 A1* | 6/2009 | Crystal | 715/764 |

(Continued)

FOREIGN PATENT DOCUMENTS

CN 1685338 A 10/2005
CN 1809796 A 7/2006

OTHER PUBLICATIONS

Matsubara et al.; Managing a Media Server Content Directory in Absence of Reliable Metadata; © 2009; IEEE; pp. 873-877.*
Stewart et al.; An Auditory Display in Playlist generation; Jul. 2011; IEEE; pp. 14-23.*
International Search Report for corresponding PCT Application No. PCT/FI2010/050956, Apr. 20, 2011, pp. 1-6.

(Continued)

Primary Examiner — Linh K Pham
(74) Attorney, Agent, or Firm — Ditthavong Mori & Steiner, P.C.

(57) ABSTRACT

A method including receiving a user selection of a first media content, determining a second media content based on characteristics of the first media content in relation to characteristics of the second media content, and determining a third media content based on the characteristics of the second media content in relation to characteristics of the third media content. The method further includes causing, at least in part, display of a first icon representing the second media content and a second icon representing the third media content.

18 Claims, 11 Drawing Sheets

(56) References Cited

U.S. PATENT DOCUMENTS

| | | |
|---|---|---|
| 2009/0164448 A1 | 6/2009 | Curtis |
| 2009/0307629 A1 | 12/2009 | Horiuchi et al. |
| 2010/0070628 A1* | 3/2010 | Harrang et al. .............. 709/224 |
| 2010/0115408 A1* | 5/2010 | Mujkic et al. ................ 715/716 |
| 2010/0229088 A1* | 9/2010 | Nakajima et al. ............. 715/702 |
| 2010/0235792 A1* | 9/2010 | Brodersen et al. ............ 715/828 |
| 2011/0131530 A1* | 6/2011 | Oosterholt .................... 715/810 |
| 2011/0164057 A1* | 7/2011 | Prabhu .......................... 345/650 |
| 2011/0246891 A1* | 10/2011 | Schubert et al. ............. 715/719 |

OTHER PUBLICATIONS

Written Opinion of the International Searching Authority for corresponding PCT Application No. PCT/FI2010/050956, Apr. 20, 2011, pp. 1-8.

Avery Wang, The Shazam Music Recognition Service, Communications of the ACM, vol. 49, No. 8, 44-48, Aug. 2006.

Korean Office Action with English Translation for corresponding Patent Application No. 10-2012-7017365, Sep. 16, 2013, 8 pages.

Supplementary European Search Report for corresponding Patent Application No. 10 83 4274 dated Dec. 6, 2013, 6 pages.

* cited by examiner

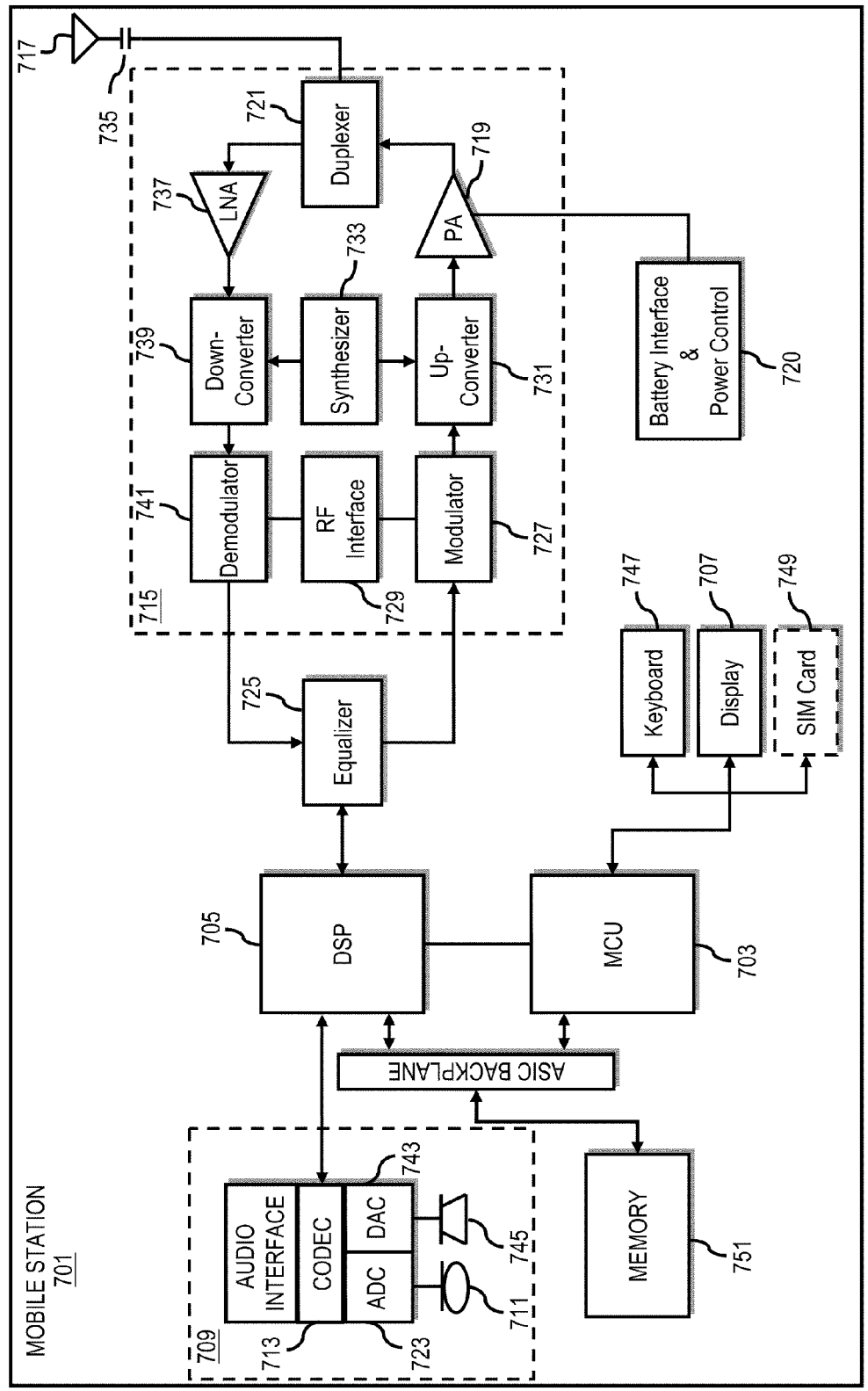

METHOD AND APPARATUS FOR PROVIDING MEDIA CONTENT SEARCHING CAPABILITIES

BACKGROUND

Service providers and device manufacturers are continually challenged to deliver value and convenience to consumers by, for example, providing compelling network services and vast array of products. Service providers can provide various user interface applications for use on user equipment that enhance the user's interface experience with the user equipment and when the user equipment is used to access various products and services offered by the service provider. For example, with the large amount of media content that is available today, users can have difficulty searching through the vast amounts of available media content when purchasing or utilizing such content. Currently available user interface applications have limitations and thus fail to provide the user with an interface that can allow for the user to fully appreciate and utilize the various products and services offered by the service provider.

SOME EXAMPLE EMBODIMENTS

Therefore, there is a need for an approach for media content searching capabilities.

According to one embodiment, a method comprises receiving a user selection of a first media content, determining a second media content based on characteristics of the first media content in relation to characteristics of the second media content, and determining a third media content based on the characteristics of the second media content in relation to characteristics of the third media content. The method further comprises causing, at least in part, display of a first icon representing the second media content and a second icon representing the third media content.

According to another embodiment, an apparatus comprising at least one processor, and at least one memory including computer program code, the at least one memory and the computer program code configured to, with the at least one processor, cause, at least in part, the apparatus to perform at least the following: receive a user selection of a first media content; determine a second media content based on characteristics of the first media content in relation to characteristics of the second media content; determine a third media content based on the characteristics of the second media content in relation to characteristics of the third media content; and cause, at least in part, display of a first icon representing the second media content and a second icon representing the third media content.

According to another embodiment, a computer-readable storage medium carrying one or more sequences of one or more instructions which, when executed by one or more processors, cause an apparatus to at least perform the following steps: receiving a user selection of a first media content; determining a second media content based on characteristics of the first media content in relation to characteristics of the second media content; determining a third media content based on the characteristics of the second media content in relation to characteristics of the third media content; and causing, at least in part, display of a first icon representing the second media content and a second icon representing the third media content.

According to another embodiment, an apparatus comprises means for receiving a user selection of a first media content, means for determining a second media content based on characteristics of the first media content in relation to characteristics of the second media content, and means for determining a third media content based on the characteristics of the second media content in relation to characteristics of the third media content. The method further comprises means for causing display of a first icon representing the second media content and a second icon representing the third media content Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a diagram of a mobile terminal (e.g., handset) that can be used to implement an embodiment of the invention.

DESCRIPTION OF SOME EMBODIMENTS

Examples of a method, apparatus, and computer program for providing media content searching capabilities are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to the use thereof on computers such as a personal computer or laptop, it is contemplated that the approach described herein may be used with any other type of user equipment and/or in conjunction with the use of on a server such as a service provider server or any other type of server.

Additionally, while various embodiments are described with respect to the selection of music or songs, it is contemplated that the approach described herein may be used with any other type of media content including, but not limited to, videos, movies, pictures, games, electronic books, television channels and/or programs, radio broadcasting channels and/or programs, media streams, point of interest (POI) information, applications, data (e.g., data regarding various products for sale online, such data being used to identify the products during an online shopping search, etc.), etc. or any combination thereof.

Furthermore, while various embodiments are described with respect to the selection of music for purchase, it is contemplated that the approach described herein may be used to allow for selection of music in a library of music for playing.

Figure 1:
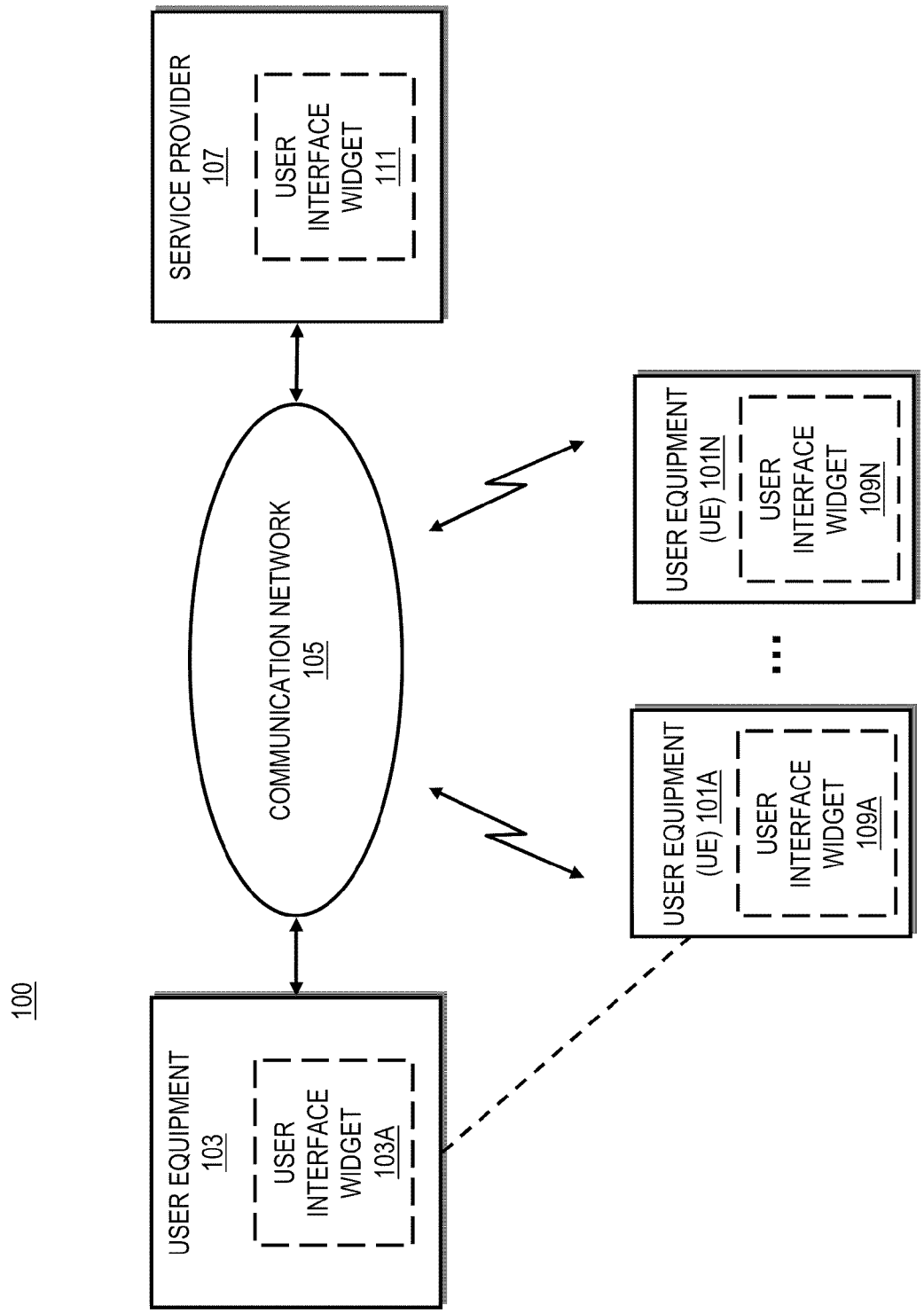
FIG. 1 is a diagram of a system capable of providing media content searching capabilities, according to an embodiment.

FIG. 1 is a diagram of a system capable of providing media content searching capabilities, according to an embodiment. As shown in FIG. 1, the system 100 comprises user equipment (UE) 101A . . . 101N and 103 having connectivity to a communication network 105. Also a service provider server 107 is provided that is also connected to communication network 105. In this figure, UE 101A . . . UE101N, UE 103, and service provider 107 are each shown as including a user interface widget 109A . . . 109N, 103A, and 111, respectively; however, it is contemplated that such a widget need not be provided in each but rather it could alternatively be provided in one or any combination of more than one such apparatuses. By way of illustration and not limitation, UE 103 could be provided as a personal computer or laptop or notebook, etc. having ser interface widget 103A, and such UE 103 could provide the user interface displays described herein without the need for any other user interface widget. Thus, if a user is utilizing the user interface display on UE 103 and accessing services or products of service provider 107, the UE 103 can utilize the user interface widget 103A in order to provide such a display, or the user interface widget 111, or a combination thereof depending on whether the application being run is local or remote. Also, by way of illustration and not limitation, UE 103 is shown as being connected to UE 101A by a dashed line, which can be any form of wireless or wired connection, such as, for example, when a mobile device is connected with a computer for syncing, etc.

By way of example, the communication network 105 of system 100 includes one or more networks such as a data network (not shown), a wireless network (not shown), a telephony network (not shown), short range wireless network (not shown), broadcast network (not shown) or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), wireless LAN (WLAN), Bluetooth® network, Ultra Wide Band (UWB) network, and the like.

The UEs 101A . . . 101N and 103A is any type of mobile terminal, fixed terminal, or portable terminal including a mobile handset, station, unit, device, multimedia computer, multimedia tablet, Internet node, communicator, communication device, desktop computer, laptop computer, Personal Digital Assistants (PDAs), audio/video player, digital still/video camera, game device, analog/digital television broadcast receiver, analog/digital radio broadcast receiver, positioning device, electronic book device, or any combination thereof. It is also contemplated that the UE 101 can support any type of interface to the user (such as "wearable" circuitry, etc.).

By way of example, the UEs 101A . . . 101N, 103, and service provider 107 can communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
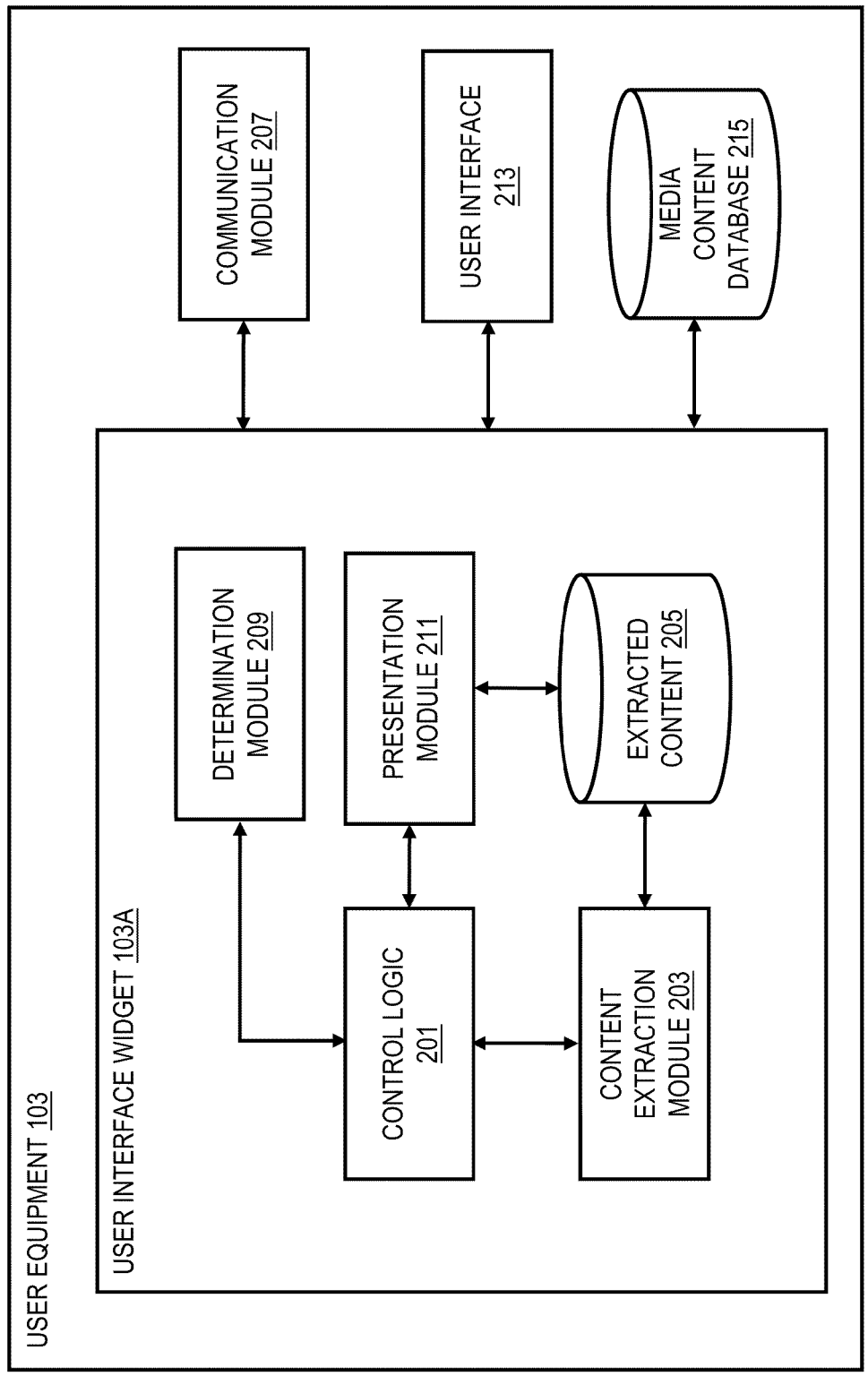
FIG. 2 is a diagram of the components of user equipment including a user interface widget, according to one embodiment.

FIG. 2 is a diagram of the components of user equipment including a user interface widget, according to one embodiment. By way of example, the user interface widget 103A includes a control logic 201 that controls the widget and media content searching sessions, a content extraction module 203, which can locate various media content data relating to the operation of the widget that can either be locally stored on the UE 103 (e.g., in media content database 215) or remotely, for example, on UE 101A . . . 101N or service provider 107, and an extracted content database 205 for storing such data. If data is needed from remote sources, then the content extraction module 203 can utilize the communication module 207 to retrieve such data. Also, the user interface widget 103A includes a determination module 209 that can perform searching functions during a media content searching session, and a presentation module 211 that can determine how to present the user interface display, for example, in combination with the user interface 213 of the UE 103.

FIG. 2 depicts the user interface widget 103A provided in UE 103 in order to search media content locally stored on the UE 103 or remotely on service provider 107 or another server or UE. Also, the user interface widgets 109A . . . 109N in UEs 101A . . . 101N can have the same components as user interface widget 103A either via communication network 105 or via the dashed-line connection to UE 103 (for UE 101A), and thus can perform similar functions. Alternatively, the user interface widget 111 can have the same components as user interface widget 103, and thus can provide media content searching functions to any UE connected thereto via the communication network 105 such that the UE can forward search selections from a user for use during a media content searching session and provide results of such searching session to the UE for display for the user. Furthermore, such user interface widgets (or one or more components thereof) can be provided at various devices/servers, which can then be used in conjunction with each other to provide the media content searching capabilities.

Figure 3A:
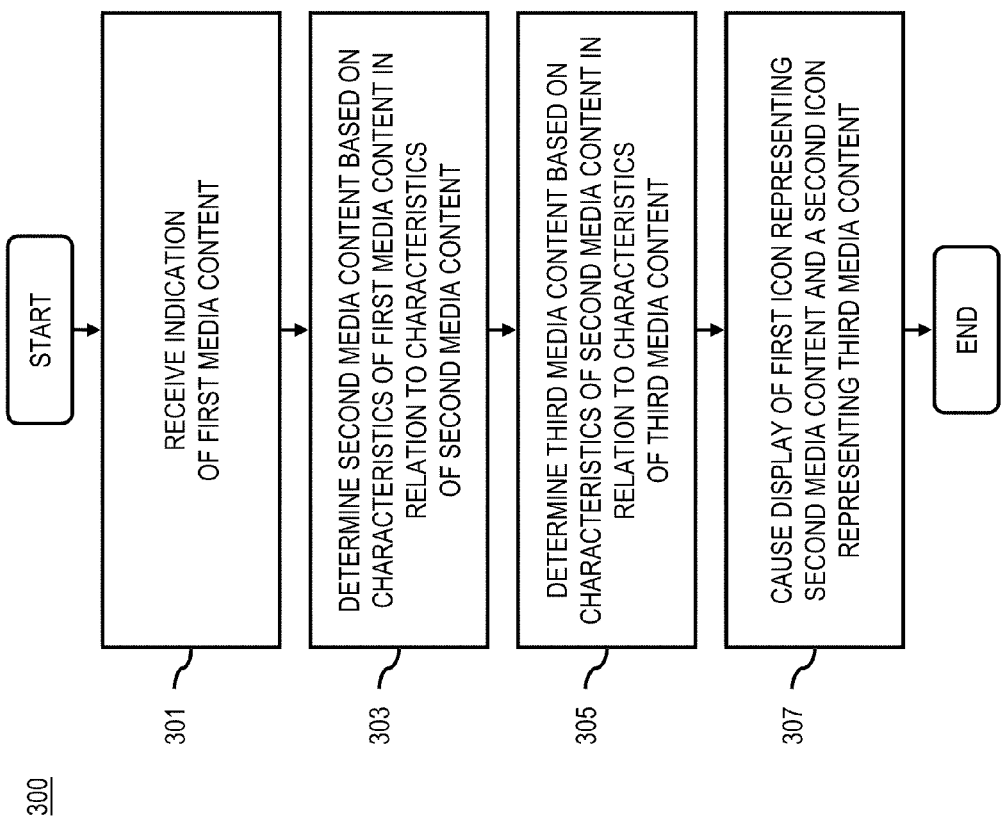
FIG. 3A is a flowchart of a process for providing media content searching capabilities, according to various embodiments.
Figure 3B:
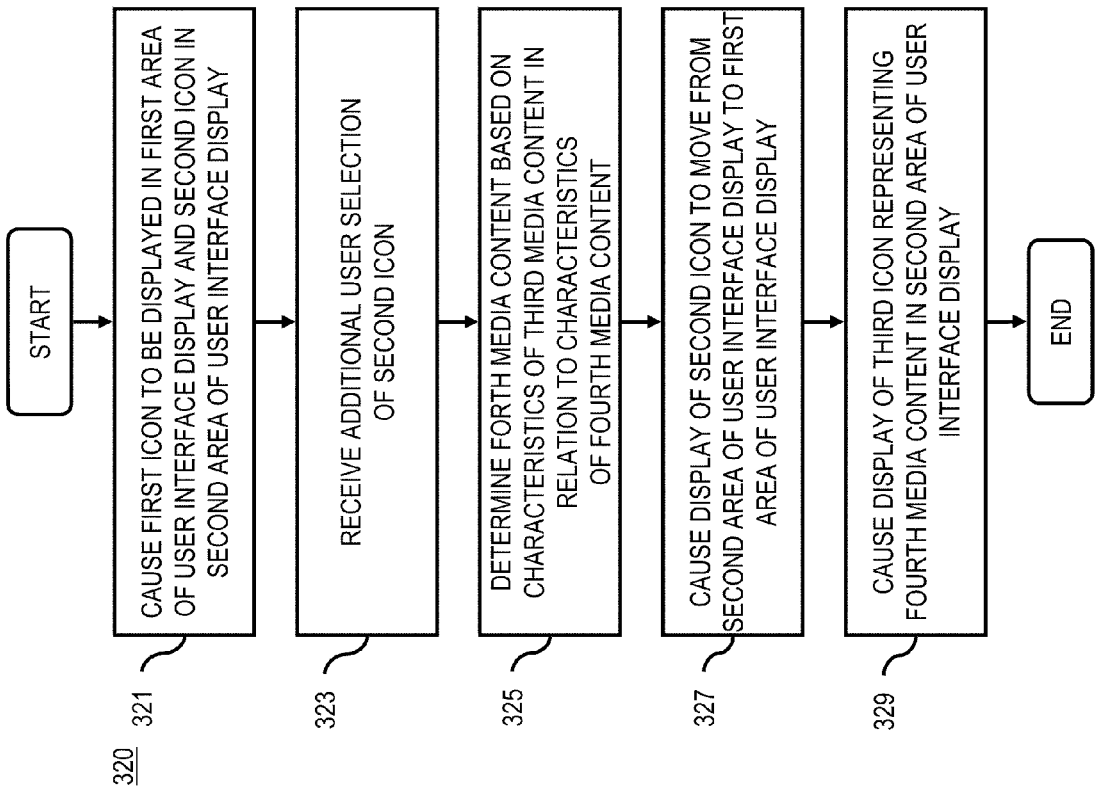
FIG. 3B is a flowchart of a process for providing successive media content search results, according to various embodiments.
Figure 3C:
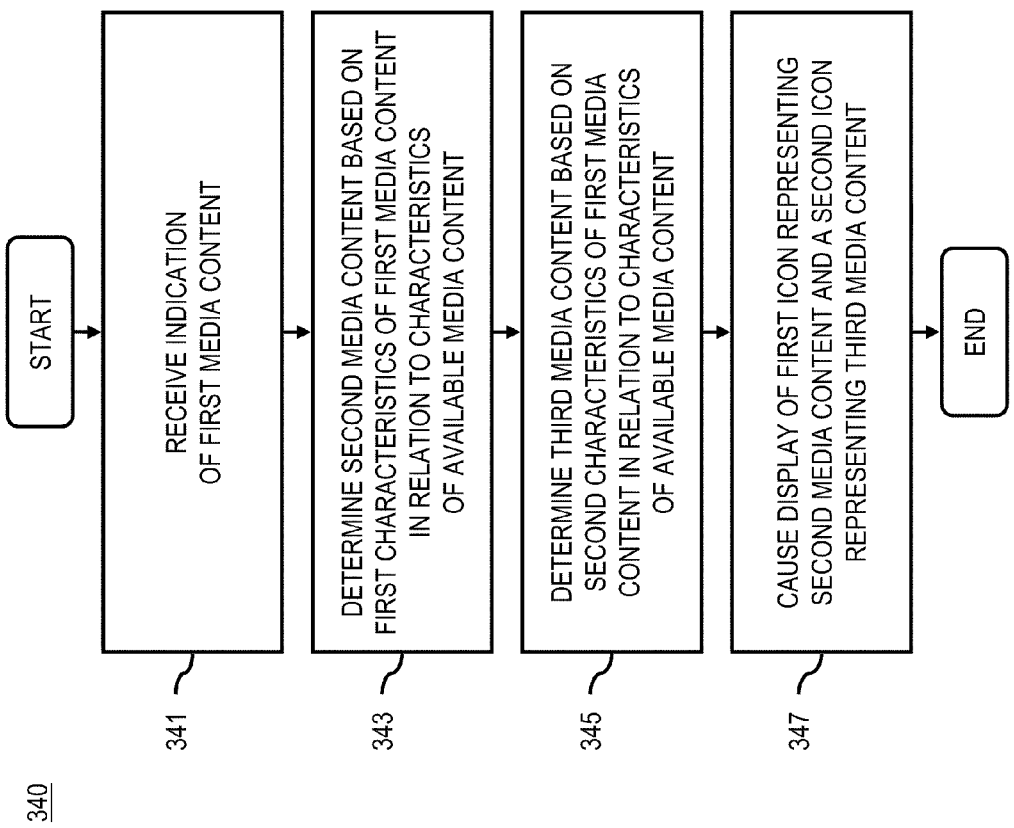
FIG. 3C is a flowchart of a process for providing media content searching capabilities, according to various embodiments.
Figure 4A:
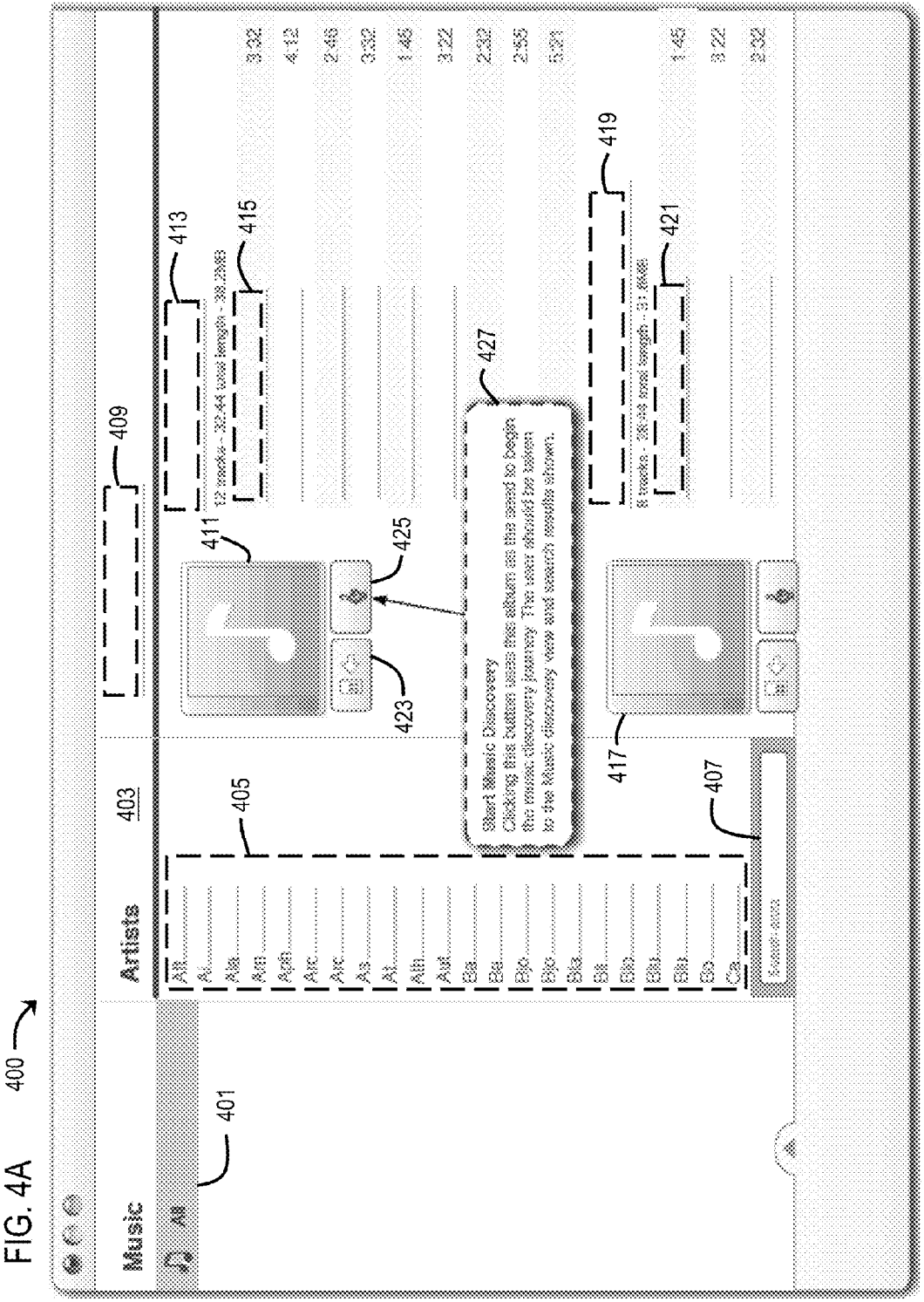
FIGS. 4A-4C are diagrams of user interface displays presented based upon the processes of FIGS. 3A and 3B, according to various embodiments.
Figure 4B:
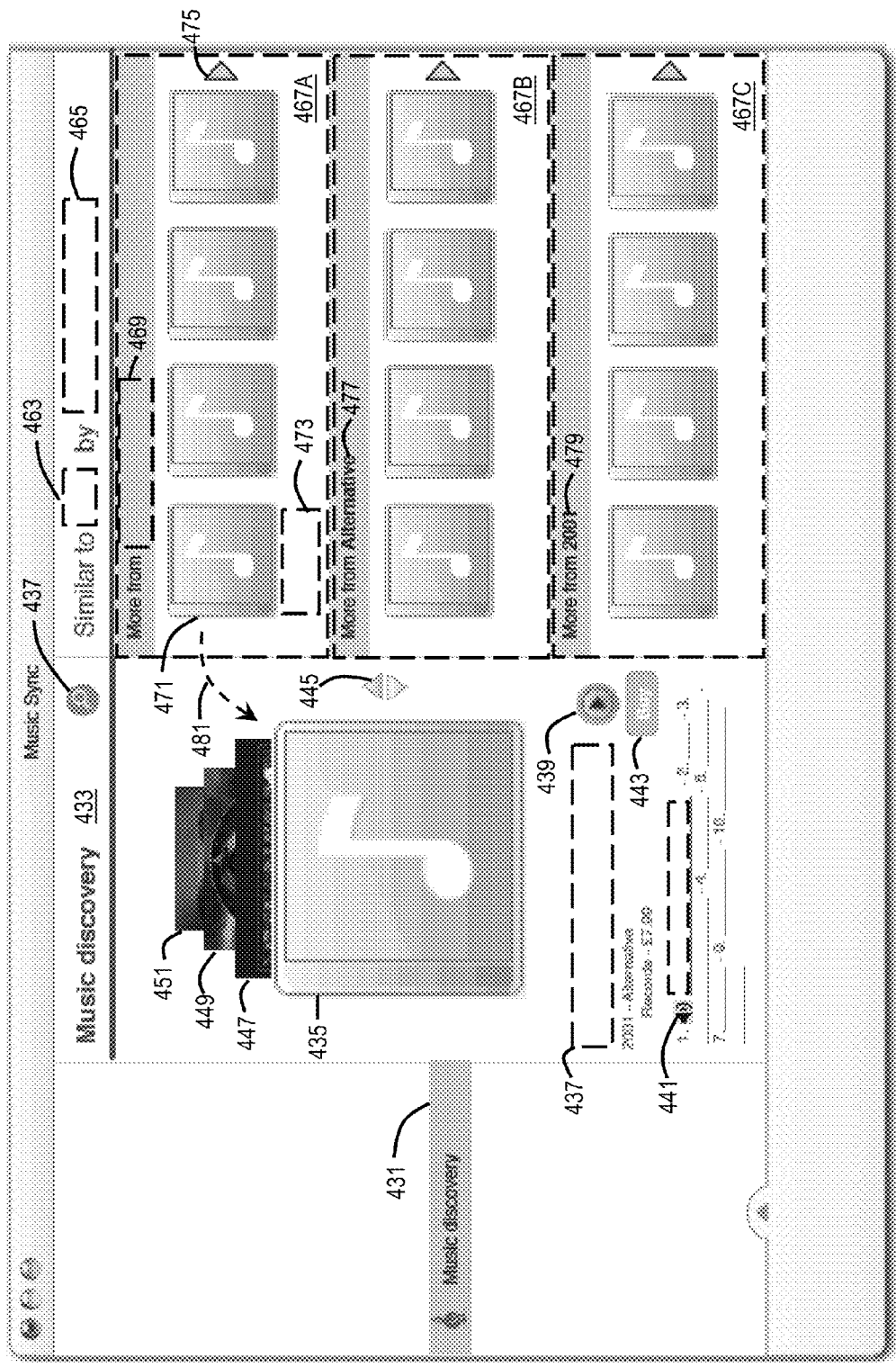
Figure 4C:
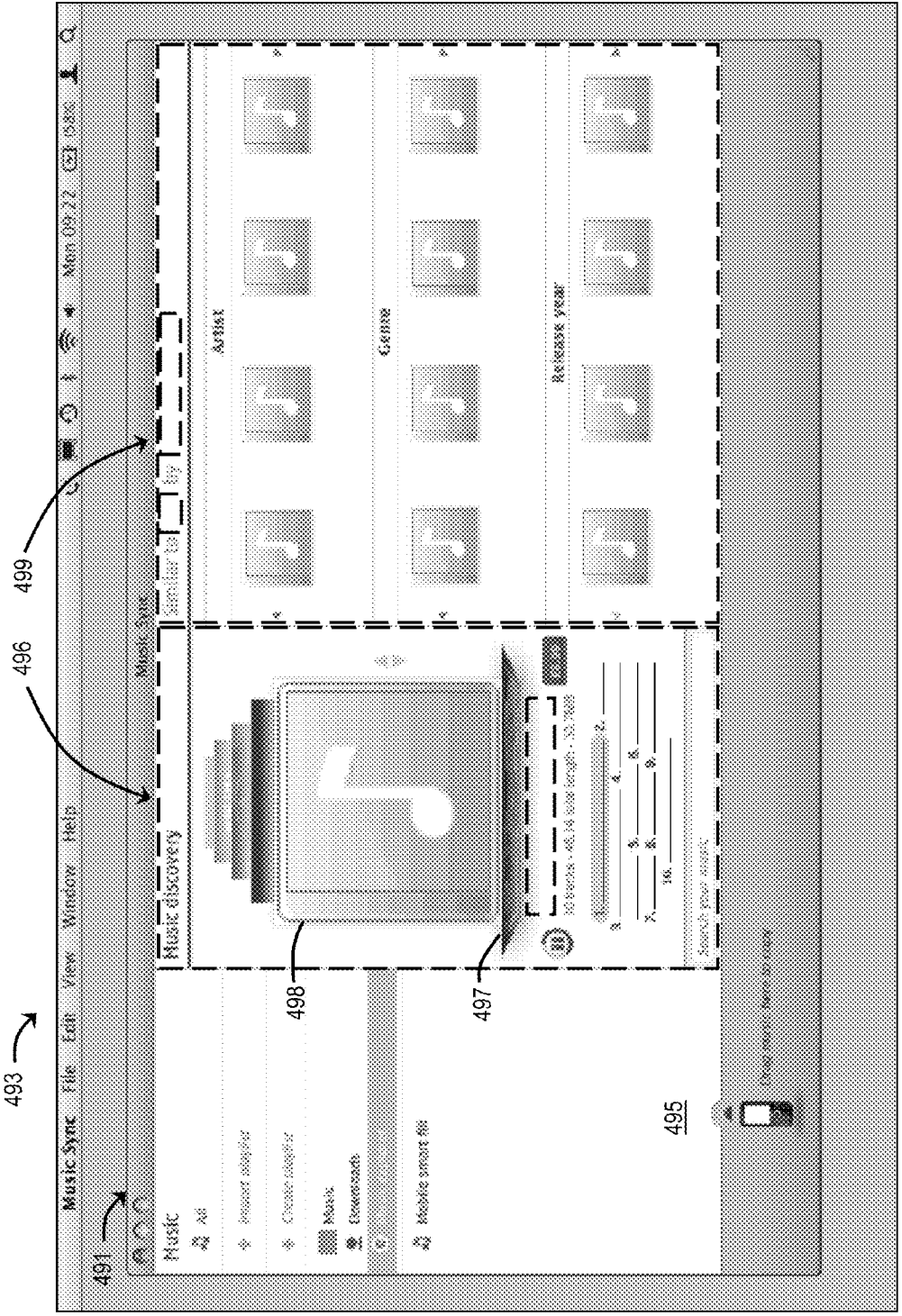

FIG. 3A is a flowchart of a process 300 for providing media content searching capabilities, according to one embodiment. FIG. 3B is a flowchart of a process 320 for providing successive media content search results, according to various embodiments, according to one embodiment. FIG. 3C is a flowchart of a process 340 for providing media content searching capabilities, according to one embodiment. In one embodiment, the user interface widget (e.g., 103A, 109A . . . 109N, and/or 111) performs the processes 300, 320, and 340, and is implemented in, for instance, a chip set including a processor and a memory as shown FIG. 6. FIGS. 4A-4C are diagrams of user interface displays presented based upon the processes of FIGS. 3A-3C, according to various embodiments.

In step 301, an indication, such as a user selection, of first media content is received. For example, as can be seen in FIG. 4A, a user interface display 400 is provided that includes a display of a music library database under an "All" music tab 401. The music library database can be representative of music stored locally (e.g., in media content database 215), remotely at another UE or at a server, etc., or a combination thereof. Additionally, note that the library could be a listing of other media content, such as movies, books, products for sale, applications, etc. Under the music tab 401, an "Artists" column 403 is then provided, which includes a listing 405 in alphabetical order of all of the artists present in the music library database. Alternatively, instead of the "Artists" column 403, the music library contents can be viewed by genre, or date of release, or album names, or any other categorization. Additionally, a search filed 407 is provided to allow a user to search the artist listing using keywords. Once the user selects an artist from the "Artist" column 403 (e.g., by using a mouse cursor, touchscreen, voice command, or other selection tool), then the selected artist name will be shown in field 409, and all of the albums by that artist will be shown in the area below the field 409. In this instance, at least two albums 411 and 417 of the selected artist are shown. The album icons 411 and 417 can be presented as album artwork that depicts the album cover. Additionally, in the area adjacent to album icon 411 is an album title field 413 with overall track count, length, and data size therebelow, and a listing of track name fields 415 with track time listed next to each track name. Similarly, in the area adjacent to album icon 417 is an album title field 419 with overall track count, length, and data size therebelow, and a listing of track name fields 421 with track time listed next to each track name. Beneath each album icon, for example, album icon 411, are a transfer button 423, which can be used to transfer a highlighted album or track to a device (e.g., from UE 103 to UE 101A via dashed line connection shown in FIG. 1), and a "Music Discovery" button 425, which can be used to begin a media content searching session. The user interface display 400 can be provided with a dialog box 427 that appears upon the first operation of the user interface display in order to provide guidance to the user, for example, here by stating that music discovery can be started by clicking the button 425 to use the highlighted track or album as a "seed" to begin the music discovery journey, and that upon selecting the seed using button 425 the user will be taken to a "Music Discovery" view (see, e.g., FIG. 4B) and search results shown. Therefore, the user will search through the music library listings until the user finds a particular album or track that the user wants to use as a seed to begin the media content searching session, and then the user will highlight the track/album and click the "Music Discovery" button next to the selected album (e.g., button 425 for album 413 or track(s) 415), thereby sending the selection of first media content to the control logic 201 to begin a media content searching session. By making such a selection, the user is attempting to find other songs/albums that are similar to the seed selection in order to find additional music or media content that the user would also enjoy.

Upon selection of the seed or first media content, the content extraction module 203 will extract metadata form the selected track/album, and/or if no or limited relevant metadata is present, then the content extraction module 203 can use an audio fingerprint of the track/album in order to identify the track/album and locate the relevant metadata either locally or from a service provider of such information via communication network 105. The metadata can include information such as track/album title, artist, genre, length, data of recording, or any other information used to categorize or describe such media content. Any information extracted or otherwise determined by the content extraction module 203 can be stored in the extracted content database 205 for later retrieval.

Based on the selection of the seed or first media content and the data extracted by the content extraction module 203, the determination module 209 will then, in step 303, determine a second media content based on characteristics of the first media content in relation to characteristics of the second media content, and, in step 305, determine a third media content based on the characteristics of the second media content in relation to characteristics of the third media content. Such determinations can be made using an algorithm that analyzes the extracted metadata in order to determine similarities between various media content in order to predict or suggest additional media content that the user might enjoy that is similar to the seed media content. Once such determinations are made, in step 307, the control logic 201 and presentation module 211 can cause display of a first icon representing the second media content and a second icon representing the third media content, for example, by sending such information to the user interface 213.

Thus, as noted above, upon selecting the seed using button 425 in FIG. 4A and the user interface widget performing the various functions in process 300, the user will be taken to a "Music Discovery" view under a "Music discovery" tab 431, as shown in FIG. 4B. The user interface display 400 will display a music discovery column 433, beneath which, in a first area, is the first icon 435 will be shown that represents the second media content, which was determined based on characteristics from the metadata of the first media content (i.e., seed) in relation to characteristics of the metadata of the second media content. The music discovery column 433 also includes a search icon 437, which can direct the user back to the library view shown in FIG. 4A or to a remote library of tracks/albums, if the user wants to select another seed track/album. In FIG. 4B, the first icon 435, as well as the other icons shown in this "Music Discovery" view, are representative of albums that a user can play, preview and/or purchase if desired. However, alternatively, the first icon and other icons in the "Music Discovery" view could be representative of albums in the music library of the user, and thus the albums shown in the first area could be a play queue.

In FIG. 4B, the album icon 435 that is upright at the front of the first area is the currently selected album, and information about that selected album is provided beneath the icon 435. For example, the album title and artist can be provided in field 437, and beneath field there is a description of the year the album was recorded, the genre of the album, the published, the price, and track names. Additionally, a toggle play/pause button 439 is provided that can allow a user to play a selected track, for example, by highlighting the track name. In FIG. 4B, the first track is highlighted and a play icon 441 is provided adjacent to the first track name in order to show which track is currently playing. In a configuration in which the albums shown are provided for sale, the interface could automatically begin a preview of each song (e.g., play the first 30 seconds), or the user can control playback of such previews using the toggle play/pause button 439. In a configuration in which the albums shown are in the music library of the user, then the interface could play full versions of the tracks. Additionally, in a configuration in which the albums are provided for sale, a "Buy" button 443 can be provided that can allow a user to select the album for purchase, for example, which can take a user to a online store to purchase the album or tracks.

As noted above, in FIG. 4B, the album icon 435 that is upright at the front of the first area is the currently selected album, and other albums 447, 449, and 451 are shown behind the album icon 435. The user can utilize control arrows 445 or use a mouse cursor to scroll through the various albums 435, 447, 449, and 451, and each of these albums represents a selected seed album and each have corresponding stored or simultaneously calculated results (i.e., the various albums shown in sections 467A, 467B, 467C, as described below) of a media content search based on that seed album which are displayed when a respective album 435, 447, 449, or 451 is selected.

Accordingly, in FIG. 4B, album icon 435 is currently select as the seed album, and based on the metadata characteristics thereof, a second area is provided on the right-hand side of the user interface display 400 that includes an album field 463 of the album icon 435, an artist field 465 of the album icon 435, and sections 467A, 467B, and 467C, which provide different categories of album listings that are each based on characteristics from the metadata of the second media content (i.e., the album represented by album icon 435) in relation to characteristics of the metadata of the second media content (i.e., the various albums listed in sections 467A, 467B, and 467C). Thus, in section 467A, album icons 471 are provided with descriptive fields 473 therebelow that are each albums by the same artist (i.e., as noted in artist field 469) as the artist of the album represented by album icon 435. Section 467A shows four different album icons; however, the user can use arrow 475 to scroll to additional album icons if desired. Section 467B includes album icons that are each albums within the same genre (i.e., "Alternative", as noted in genre field 477) as the album represented by album icon 435. Section 467C includes album icons that are each albums that were recorded the same year (i.e., in 2001 as noted in year field 479) as the album represented by album icon 435. Each of the results shown in sections 467A, 467B, and 467C are determined by the determination module 209 based on the characteristics of the album represented by album icon 435 and the characteristics of the albums shown in the results in sections 467A, 467B, and 467C in the same manner as between the seed track/album and the album represented by album icon 325, and then further categorized by artist, genre, and date of recording, respectively. Other categorizes can be utilized, either as default categories, or as selected by preferences of the user, or the widget can earn patterns of the user and select appropriate categories based on such patterns. Within each section 467A, 467B, and 467C, the album icons shown therein can be listed in order of relevance, for example, from left-to-right, where the leftmost icon provides the closest match to the album represented by album icon 435 within that category, with lesser degrees of relevance shown rightward.

As shown in FIG. 4B, the user can select one of the album icons within sections 467A, 467B, and 467C to use as a new seed for a further media content search. Thus, as shown in FIG. 4B and set forth in step 321 of process 320 in FIG. 3B, the first icon or, in this instance, album icon 435, is displayed in the first area beneath music discovery column 433, and the second icon or, in this instance album icon 471, is displayed in the second area (i.e., 467A, 467B, 467C). In step 323, an additional user selection of a second icon is received, for example, by the user selecting album icon 471. Then, in step 325, fourth media content will be determined based on characteristics of the third media content (i.e., album represented by album icon 471) in relation to characteristics of the fourth media content. Then, in step 327, the second icon 471 is caused to move from the second area (i.e., 467A, 467B, 467C) to the first area beneath music discovery column 433, and thus would be shown in front of album icon 435. Then, in step 329, third icon(s) that represent the fourth media content will be caused to be displayed the second area (i.e., by repopulating sections 467A, 467B, 467C based on the newly selected album). Note that, even though the album icon 435 will be pushed backwards in the first area and icon 471 will be displayed in front thereof, the user interface widget will store the search results found with respect to album icon 435 for historical purposes, and therefore if the user scrolls to icon 435 using arrows 445, then these historical search results can be displayed again.

FIG. 4C shows another user interface display 491 as a window on a display screen 493, which further includes a copy area 495 that can provide a user with the ability to drag and drop a selected album icon into the area 495 in order to purchase and copy the media content onto a mobile device or other UE. The user interface display 491 also shows a first area 496 that includes a historical record of various seed albums that have been selected by the user to perform various media content searches. For example, in this instance, an album icon 497 is shown in the front location; however, the user has scrolled to another album icon 498 in order to view the stored media content search results thereof, which are then displayed in categorized sections of a second area 499 on the user interface display 491.

FIGS. 3C, 4B, and 4C depict an alternative embodiment of a process for providing media content searching capabilities. In this embodiment, the seed media/album/track is selected directly from the music discovery column 433 or first area 496, or from the second area 467A, 467B, 467C, and/or 499. When selecting the seed media/album/track from the music discovery column 433 or first area 496, the media/album/song icons 435, 447, 449, 551, etc. can be scrolled through on the display, and a seed media album/track can be selected. The user can also select one of the album icons within sections 467A, 467B, and 467C to use as a new seed for a further media content search. Any media/album/track in the sections 467A-C can be dragged to the first area 433/496 to become as a new seed, whereafter a new comparison and/or calculation is performed.

Thus, as shown in step 341 of the process 340 in FIG. 3C, the selection of a media/album/track in the first or second area provides an indication of the first media content, and the new seed media/album/track is then displayed within the first area. In step 343, second media content is determined based on first characteristics (e.g., year of recording, artist, genre, etc.) of the first media content (i.e. the selected seed media/album/track, and in step 345, third media content is determined based on second characteristics (e.g., another of year of recording, artist, genre, etc.) of the first media content. In step 347, one or more first icons are displayed (e.g., within section 467A, 467B, or 467C) representing the second media content and one or more second icons are displayed (e.g., within another of section 467A, 467B, 467C) representing the third media content.

Whenever a new seed media/album/track is on the front of the first area, then the second area (e.g., sections 467A-C, and 499) are automatically updated by simultaneous comparison and/or calculation of metadata of the seed to other related media/album/song that are available in a user device, in any other available device, and/or in any network service (such as online media store/shop). The second area (e.g., sections 467A-C, and 499) displays found and relating media/albums/tracks based on the charactering metadata of that section (e.g., genre, artist, same year, videos related to album/song, albums/songs related to video, already purchased content, content available in different devices, content available on different online services, etc.).

To make the comparison and/or calculation of metadata of the seed to metadata of other related media/albums/songs faster, in some embodiments, only metadata that are defined in each of the sections 467A-C of the second area is used during the search.

Thus, embodiments of the methods and apparatuses described herein provide a user interface display that allows a user to easily, quickly, and efficiently sort through media content for purchase or for access thereto by allowing a user to select a seed media content, and using that seed to present suggested media content based on a comparison of characteristics of the seed with characteristics of other media content. The user is also provided with additional categorized recommendations that provide a further level of suggested media content. The user can then review the suggestions, select additional media content seeds, and follow down further paths of suggestions. Thus, the user is provided with a quick and easy process by which the user can find media content of interest to that user, based on the characteristics of the media content selected by the user. Therefore, such methods and apparatuses can present the user with relevant media content very quickly, thus reducing processor usage, bandwidth usage, and energy usage, and increasing the likelihood that a user will purchase and utilize such media content.

The processes described herein for providing media content searching capabilities may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
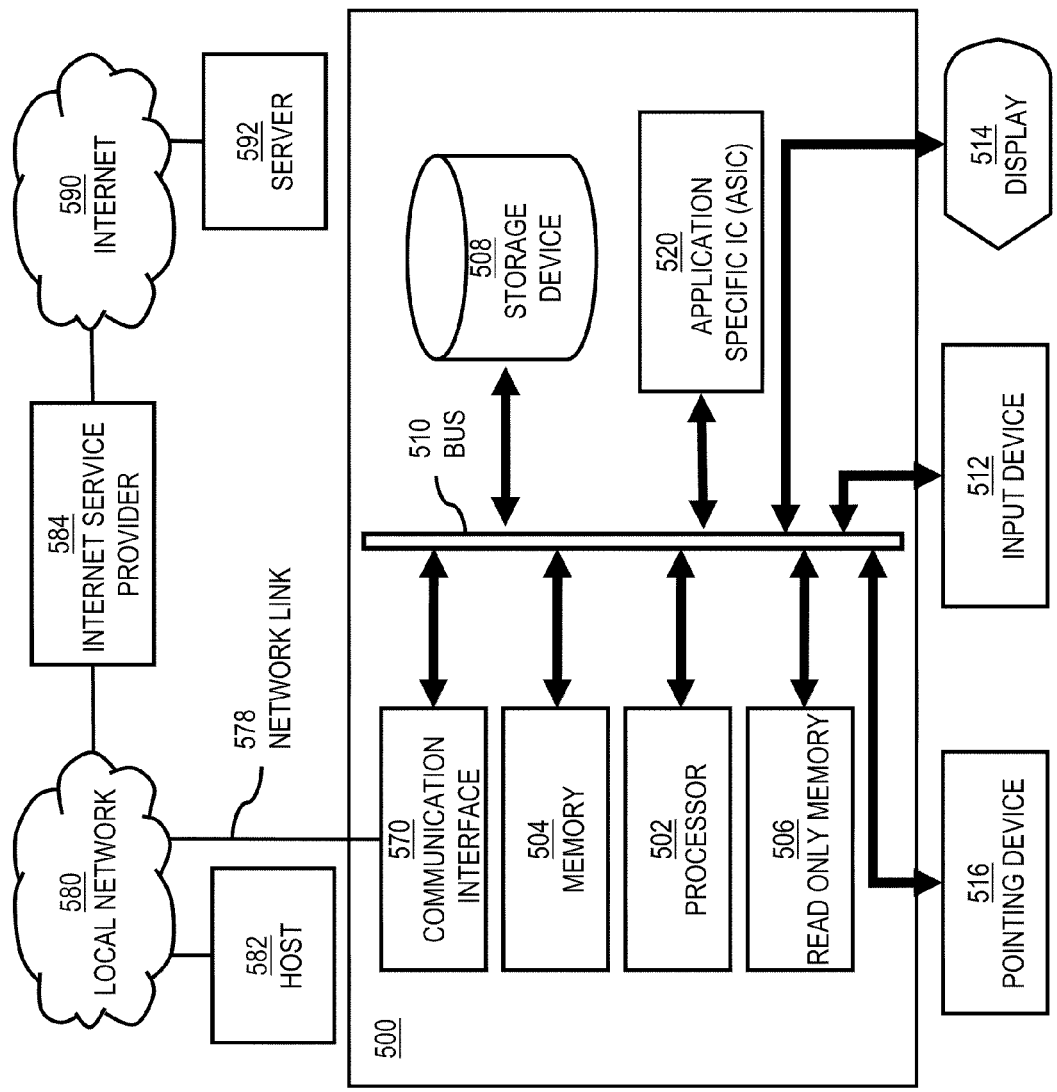
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide media content searching capabilities as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing media content searching capabilities.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to provide media content searching capabilities. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for providing media content searching capabilities. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing media content searching capabilities, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing media content searching capabilities to the UE 101A . . . 101N or UE 103.

The term "computer-readable medium" as used herein to refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
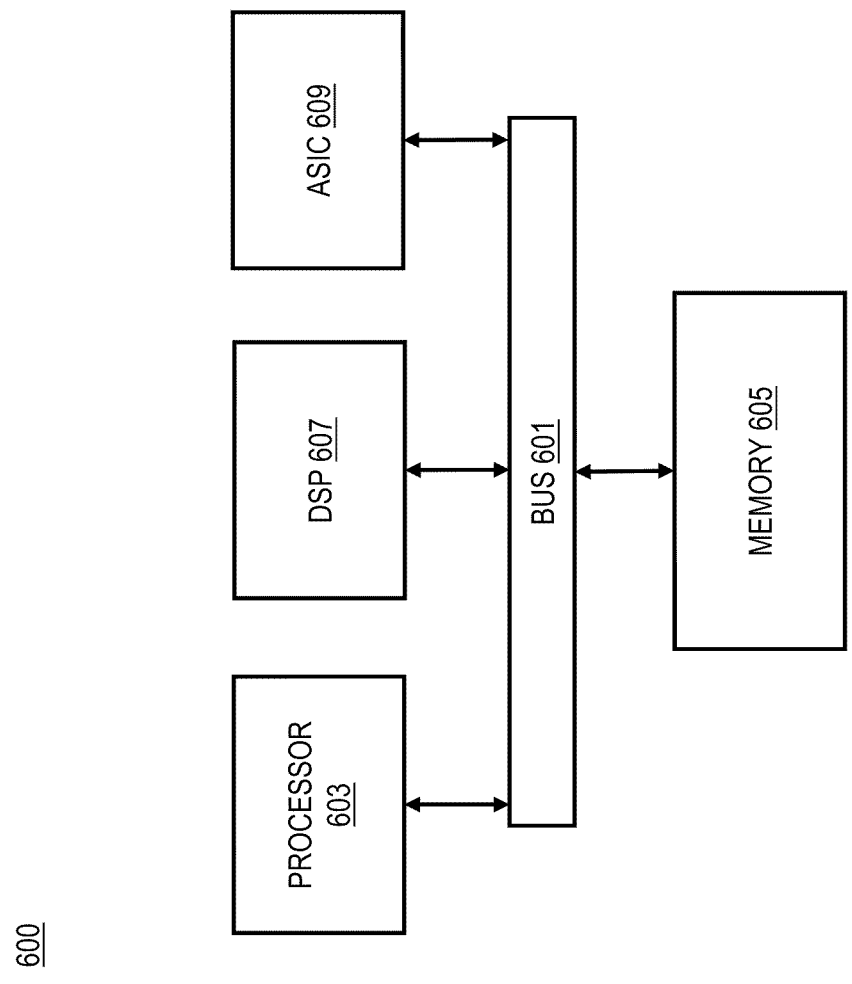
FIG. 6 is a diagram of a chip set that can be used to implement an embodiment of the invention.

FIG. 6 illustrates a chip set 600 upon which an embodiment of the invention may be implemented. Chip set 600 is programmed to provide media content searching capabilities as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of providing media content searching capabilities.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide media content searching capabilities. The memory 605 also stores the data associated with or generated by the execution of the inventive steps.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of providing media content searching capabilities. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing media content searching capabilities. The display 7 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide media content searching capabilities. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving an indication of a first media content;
determining a second media content based on characteristics of the first media content in relation to characteristics of the second media content;

determining a third media content based on the characteristics of the second media content in relation to characteristics of the third media content;

causing, at least in part, display of a first icon representing the second media content and a second icon representing the third media content, wherein the first icon is caused to be displayed in a first area of a user interface display and the second icon is caused to be displayed in a second area of the user interface display;

receiving an additional user selection of the second icon representing the third media content;

determining a fourth media content based on the characteristics of the third media content in relation to characteristics of the fourth media content;

causing, at least in part, display of the second icon to move from the second area of the user interface display to the first area of the user interface display; and causing, at least in part, display of a third icon representing the fourth media content in the second area of the user interface display, wherein the first icon representing the second media content remains within the first area when the second icon representing the third media content is moved from the second area to the first area and is depicted as being behind the second icon.

2. A method of claim 1, further comprising:

determining a plurality of additional media content based on the characteristics of the second media content in relation to respective characteristics of the plurality of additional media content; and causing, at least in part, display of a plurality of additional icons representing the respective plurality of additional media content, wherein the plurality of additional icons is caused to be displayed in the second area of the user interface display.

3. A method of claim 2, further comprising:

causing, at least in part, storage of historical data for each of the third media content and the plurality of additional media content determined with respect to the second media content for display of the second icon and the plurality of additional icons in the second area of the user interface display upon user selection of the first icon in the first area of the user interface display.

4. A method of claim 2, wherein the second icon and the plurality of additional icons are caused to be displayed in a plurality of groups categorized based on predetermined criteria in relation to the characteristics of the second media content.

5. A method of claim 4, wherein the second icon and the plurality of additional icons are caused to be displayed in each of the plurality of groups in order based on relevance of the characteristics of the third media content and the characteristics of the plurality of additional media content as compared to the characteristics of the second media content.

6. An apparatus comprising:

at least one processor; and at least one memory including computer program code, the at least one memory and the computer program code configured to, with the at least one processor, cause, at least in part, the apparatus to perform at least the following, receive an indication of a first media content;

determine a second media content based on characteristics of the first media content in relation to characteristics of the second media content;

determine a third media content based on the characteristics of the second media content in relation to characteristics of the third media content;

cause, at least in part, display of a first icon representing the second media content and a second icon representing the third media content, wherein the first icon is caused to be displayed in a first area of a user interface display and the second icon is caused to be displayed in a second area of the user interface display;

receive an additional user selection of the second icon representing the third media content;

determine a fourth media content based on the characteristics of the third media content in relation to characteristics of the fourth media content;

cause, at least in part, display of the second icon to move from the second area of the user interface display to the first area of the user interface display; and cause, at least in part, display of a third icon representing the fourth media content in the second area of the user interface display, wherein the first icon representing the second media content remains within the first area when the second icon representing the third media content is moved from the second area to the first area and is depicted as being behind the second icon.

7. An apparatus of claim 6, wherein the apparatus is further caused, at least in part, to:

determine a plurality of additional media content based on the characteristics of the second media content in relation to respective characteristics of the plurality of additional media content; and cause, at least in part, display of a plurality of additional icons representing the respective plurality of additional media content, wherein the plurality of additional icons is caused to be displayed in the second area of the user interface display.

8. An apparatus of claim 7, wherein the apparatus is further caused, at least in part, to:

cause, at least in part, storage of historical data for each of the third media content and the plurality of additional media content determined with respect to the second media content for display of the second icon and the plurality of additional icons in the second area of the user interface display upon user selection of the first icon in the first area of the user interface display.

9. An apparatus of claim 7, wherein the second icon and the plurality of additional icons are caused to be displayed in a plurality of groups categorized based on predetermined criteria in relation to the characteristics of the second media content.

10. An apparatus of claim 9, wherein the second icon and the plurality of additional icons are caused to be displayed in each of the plurality of groups in order based on relevance of the characteristics of the third media content and the characteristics of the plurality of additional media content as compared to the characteristics of the second media content.

11. A non-transitory computer-readable storage medium carrying one or more sequences of one or more instructions which, when executed by one or more processors, cause an apparatus to at least perform the following steps:

receiving an indication of a first media content;

determining a second media content based on characteristics of the first media content in relation to characteristics of the second media content;

determining a third media content based on the characteristics of the second media content in relation to characteristics of the third media content;

causing, at least in part, display of a first icon representing the second media content and a second icon representing the third media content, wherein the first icon is caused to be displayed in a first area of a user interface display and the second icon is caused to be displayed in a second area of the user interface display;

receiving an additional user selection of the second icon representing the third media content;

determining a fourth media content based on the characteristics of the third media content in relation to characteristics of the fourth media content;

causing, at least in part, display of the second icon to move from the second area of the user interface display to the first area of the user interface display; and causing, at least in part, display of a third icon representing the fourth media content in the second area of the user interface display, wherein the first icon representing the second media content remains within the first area when the second icon representing the third media content is moved from the second area to the first area and is depicted as being behind the second icon.

12. A non-transitory computer-readable storage medium of claim 11, wherein the apparatus is caused, at least in part, to further perform:

determining a plurality of additional media content based on the characteristics of the second media content in relation to respective characteristics of the plurality of additional media content; and causing, at least in part, display of a plurality of additional icons representing the respective plurality of additional media content, wherein the plurality of additional icons is caused to be displayed in the second area of the user interface display.

13. A non-transitory computer-readable storage medium of claim 12, wherein the apparatus is caused, at least in part, to further perform:

causing, at least in part, storage of historical data for each of the third media content and the plurality of additional media content determined with respect to the second media content for display of the second icon and the plurality of additional icons in the second area of the user interface display upon user selection of the first icon in the first area of the user interface display.

14. A non-transitory computer-readable storage medium of claim 12, wherein the second icon and the plurality of additional icons are caused to be displayed in a plurality of groups categorized based on predetermined criteria in relation to the characteristics of the second media content.

15. A non-transitory computer-readable storage medium of claim 14, wherein the second icon and the plurality of additional icons are caused to be displayed in each of the plurality of groups in order based on relevance of the characteristics of the third media content and the characteristics of the plurality of additional media content as compared to the characteristics of the second media content.

16. A method comprising:

receiving an indication of a first media content;

determining a second media content based on first characteristics of the first media content in relation to characteristics of available media content;

determining a third media content based on second characteristics of the first media content in relation to characteristics of the available media content;

causing, at least in part, display of a first icon representing the second media content and a second icon representing the third media content, wherein the first icon is caused to be displayed in a first area of a user interface display and the second icon is caused to be displayed in a second area of the user interface display;

receiving an additional user selection of the second icon representing the third media content;

determining a fourth media content based on the characteristics of the third media content in relation to characteristics of the fourth media content;

causing, at least in part, display of the second icon to move from the second area of the user interface display to the first area of the user interface display; and causing, at least in part, display of a third icon representing the fourth media content in the second area of the user interface display, wherein the first icon representing the second media content remains within the first area when the second icon representing the third media content is moved from the second area to the first area and is depicted as being behind the second icon.

17. An apparatus comprising:

at least one processor; and at least one memory including computer program code, the at least one memory and the computer program code configured to, with the at least one processor, cause, at least in part, the apparatus to perform at least the following, receive an indication of a first media content;

determine a second media content based on first characteristics of the first media content in relation to characteristics of available media content;

determine a third media content based on second characteristics of the first media content in relation to characteristics of the available media content;

cause, at least in part, display of a first icon representing the second media content and a second icon representing the third media content, wherein the first icon is caused to be displayed in a first area of a user interface display and the second icon is caused to be displayed in a second area of the user interface display;

receive an additional user selection of the second icon representing the third media content;

determine a fourth media content based on the characteristics of the third media content in relation to characteristics of the fourth media content;

cause, at least in part, display of the second icon to move from the second area of the user interface display to the first area of the user interface display; and cause, at least in part, display of a third icon representing the fourth media content in the second area of the user interface display, wherein the first icon representing the second media content remains within the first area when the second icon representing the third media content is moved from the second area to the first area and is depicted as being behind the second icon.

18. A non-transitory computer-readable storage medium carrying one or more sequences of one or more instructions which, when executed by one or more processors, cause an apparatus to at least perform the following steps:

receiving an indication of a first media content;

determining a second media content based on first characteristics of the first media content in relation to characteristics of available media content;

determining a third media content based on second characteristics of the first media content in relation to characteristics of the available media content;

causing, at least in part, display of a first icon representing the second media content and a second icon representing the third media content, receiving an additional user selection of the second icon representing the third media content;

determining a fourth media content based on the characteristics of the third media content in relation to characteristics of the fourth media content;

causing, at least in part, display of the second icon to move from the second area of the user interface display to the first area of the user interface display; and causing, at least in part, display of a third icon representing the fourth media content in the second area of the user interface display, wherein the first icon representing the second media content remains within the first area when the second icon representing the third media content is moved from the second area to the first area and is depicted as being behind the second icon.

* * * * *